(12) United States Patent
Hastings et al.

(10) Patent No.: US 6,932,770 B2
(45) Date of Patent: Aug. 23, 2005

(54) METHOD AND APPARATUS FOR ULTRASONIC IMAGING

(75) Inventors: Harold M. Hastings, Garden City, NY (US); Steven J. L. Evans, Mamaroneck, NY (US); Scott L. Roth, East Hills, NY (US)

(73) Assignee: Prisma Medical Technologies LLC, New Hyde Park, NY (US)

( * ) Notice: Subject to any disclaimer, the term of this patent is extended or adjusted under 35 U.S.C. 154(b) by 41 days.

(21) Appl. No.: 10/633,949

(22) Filed: Aug. 4, 2003

(65) Prior Publication Data

US 2005/0033166 A1 Feb. 10, 2005

(51) Int. Cl.[7] .............................................. A61B 8/00
(52) U.S. Cl. ...................................................... 600/443
(58) Field of Search ................................ 600/437–472; 128/916; 73/625, 626; 367/7, 11, 130, 138; 382/132

(56) References Cited

U.S. PATENT DOCUMENTS

| | | | |
|---|---|---|---|
| 4,771,470 A | | 9/1988 | Geiser et al. |
| 4,817,015 A | | 3/1989 | Insana et al. |
| 4,982,339 A | | 1/1991 | Insana et al. |
| 5,409,007 A | | 4/1995 | Saunders et al. |
| 5,417,215 A | | 5/1995 | Evans et al. |
| 5,497,777 A | | 3/1996 | Abdel-Malek et al. |
| 5,619,998 A | | 4/1997 | Abdel-Malek et al. |
| 5,754,676 A | * | 5/1998 | Komiya et al. .............. 382/132 |
| 5,777,891 A | * | 7/1998 | Pagano et al. ................. 702/39 |
| 5,839,441 A | | 11/1998 | Steinberg |
| 5,908,389 A | * | 6/1999 | Roundhill et al. ........... 600/443 |
| 6,739,511 B2 | * | 5/2004 | Tsikos et al. ........... 235/462.01 |

* cited by examiner

*Primary Examiner*—Ali Imam
(74) *Attorney, Agent, or Firm*—Sonnenschein Nath & Rosenthal LLP (57) ABSTRACT

A method for reducing speckle in an ultrasonic image formed from a digitized scan line including linearly arranged signal intensity data points obtained from ultrasonic energy reflected by structures within a body. The scan line is divided into intensity pixels. Each intensity pixel includes at least one data point. A raw intensity level and a feature gain factor are determined for each intensity pixel. A corrected intensity level is calculated for each intensity pixel by multiplying the raw intensity level for each intensity pixel by the corresponding feature gain factor. The corrected intensity level of each intensity pixel is displayed.

53 Claims, 4 Drawing Sheets

METHOD AND APPARATUS FOR ULTRASONIC IMAGING

BACKGROUND OF THE INVENTION

The present invention relates generally to ultrasonic imaging, and more particularly to a technique for increasing a signal-to-noise ratio and reducing speckle in ultrasonic images used for making medical diagnoses.

Ultrasonic imaging, which is used to provide visual representations of tissues in patients so medical personnel may make appropriate diagnoses, is performed using apparatus including a transducer having elements that emit ultrasonic energy into the body of a patient. The energy is reflected by tissue in the body and the reflected energy is converted to an electrical signal by other elements in the transducer. The intensity of the electrical signal varies with the characteristics of the tissue. The elements in the transducer are typically arranged in an array and the output from the elements is displayed as an image on a video monitor.

The usefulness of ultrasonic imaging is somewhat limited by a low signal-to-noise ratio in the resulting images. When ultrasonic energy is reflected by a specular target such as a tissue interface having relatively large and generally planar surfaces, the reflected energy provides a distinct image. However, energy reflected from different depths in the body or from curved surfaces may be out of phase with other reflected energy. As a result, the energy may either subtract from or add to other reflected energy, causing holes and bright spots in the image. When ultrasonic energy is reflected from small discrete targets such as cell structures within the tissue having dimensions on the order of the wavelength of the ultrasonic energy, the reflected energy scatters in all directions causing spherical wave fronts. For this reason, these small discrete targets are referred to as "scatterers". The spherical wave fronts subtract from and add to each other, producing a finely textured salt-and-pepper interference pattern superimposed on the image produced by specular targets. This pattern is commonly referred to as acoustic speckle and may have an intensity equal to or greater than other features of the image. Acoustic speckle blurs the edges of images produced by specular targets and degrades the resolution of the resulting image. Further, the speckle obscures information about the small targets.

Most previous attempts to reduce speckle in ultrasonic images use averaging techniques that reduce speckle by reducing small scale variations in the image. Reducing small scale variations blurs the image. Although blurring the image can be useful because it reduces pseudo-random variability such as speckle, it can also significantly reduce image quality by obscuring boundaries and small scale features.

Other attempts to reduce speckle in ultrasonic images have used higher-order statistics. One method discriminates different tissue textures by assuming a single, well-defined spatial texture scale. Linear and higher order statistical terms are added, and an estimated noise curve is subtracted from the signal to locate features within a feature space. This approach assumes the return can be represented as "signal plus noise". Small-scale details are treated as noise and subtracted from the ultrasound signal. Thus, this approach is similar to an averaging approach. Moreover, subtraction frequently magnifies errors when the signal includes a large amount of noise, which is not uncommon where the signal is highly attenuated.

Another family of approaches for reducing speckle involves comparing images taken under slightly different conditions and assumes high speckle regions have a greater relative difference than low speckle regions. For example, one method uses a pair of images in which the transducer is moved slightly between obtaining data for the first image and obtaining data for the second image. Subtracting the data obtained for the second image from that obtained from the first image, shows regions of high variability such as resulting from speckle. However, since speckle is random, this method does not detect all speckle. Further, high variability also results from small features and boundaries that may be important in diagnoses, but this method obscures these features. Moreover, the subtraction technique used in this method sometimes magnifies errors.

Still other approaches use asymmetric gradient operators. The use of gradient operators also involves subtraction and has the inherent problems associated with subtraction such as loss of small scale information and potential magnification of errors. Further, since boundaries also produce large gradients, important features can be missed because this method regards them as noise.

SUMMARY OF THE INVENTION

Briefly, the present invention includes a method for reducing speckle in an ultrasonic image formed from a digitized scan line including a plurality of linearly arranged signal intensity data points obtained from ultrasonic energy reflected by structures within a body. The method comprises dividing the scan line into a plurality of intensity pixels. Each of the intensity pixels includes at least one data point of the plurality of signal intensity data points. Further, the method comprises determining a raw intensity level for each of the plurality of intensity pixels, and determining a feature gain factor for each pixel of the plurality of intensity pixels. A corrected intensity level is calculated for each of the plurality of intensity pixels by multiplying the raw intensity level for each intensity pixel by the feature gain factor for the corresponding intensity pixel. The method also comprises displaying the corrected intensity level of each of the plurality of intensity pixels.

In another aspect, a method of the invention comprises dividing the scan line into a plurality of intensity pixels and determining a raw intensity level for each of the plurality of intensity pixels. Further, the method includes selecting a feature detection pixel corresponding to each intensity pixel of the plurality of intensity pixels. Each of the feature detection pixels includes at least one data point of the plurality of signal intensity data points. In addition, the method includes developing a normalized power spectrum for each feature detection pixel and determining a feature gain factor for each feature detection pixel from the normalized power spectrum thereof. A corrected intensity is calculated and displayed for each of the plurality of intensity pixels.

In still another aspect, the present invention includes apparatus for reducing speckle in an ultrasonic image formed from a digitized scan line including a plurality of linearly arranged signal intensity data points obtained from ultrasonic energy reflected by structures within a body. The apparatus comprises a control and processor unit having means for dividing the scan line into a plurality of intensity pixels. Each of the intensity pixels includes at least one data point of the plurality of signal intensity data points. The control and processor unit also includes means for determining a raw intensity level for each of the plurality of intensity pixels, means for determining a feature gain factor for each pixel of the plurality of intensity pixels, and means for calculating a corrected intensity level for each of the plurality of intensity pixels by multiplying the raw intensity level for each intensity pixel by the feature gain factor for the corresponding intensity pixel. Further, the apparatus comprises a display for displaying the corrected intensity level of each of the plurality of intensity pixels.

In a further aspect, the present invention includes apparatus for producing an ultrasonic image comprising a transducer for emitting ultrasonic energy into a body and receiving ultrasonic energy reflected by structures in the body as digitized scan lines. Further, the apparatus includes a control and processing unit operatively connected to the transducer and a display operatively connected to the control and processing unit for displaying the corrected intensity level of each of the plurality of intensity pixels.

In yet another aspect, the present invention includes apparatus comprising a control and processor unit having means for dividing the scan line into a plurality of intensity pixels, means for determining a raw intensity level for each of the intensity pixels, and means for selecting a feature detection pixel corresponding to each of the intensity pixels. Each of the feature detection pixels includes at least one signal intensity data point. The control and processor unit also includes means for developing a normalized power spectrum for each feature detection pixel, means for determining a feature gain factor for each feature detection pixel from the normalized power spectrum thereof, and means for calculating a corrected intensity level for each intensity pixel by multiplying the raw intensity level for each intensity pixel by the feature gain factor for the corresponding intensity pixel. The apparatus also includes a display for displaying the corrected intensity level of each intensity pixel.

In a final aspect, the present invention includes apparatus for producing an ultrasonic image comprising a transducer for emitting ultrasonic energy into a body and receiving ultrasonic energy reflected by structures in the body as digitized scan lines. Each of the lines includes a plurality of linearly arranged signal intensity data points. The apparatus further includes a control and processing unit operatively connected to the transducer for controlling the transducer and for processing the digitized scan lines by dividing the scan line into a plurality of intensity pixels, determining a raw intensity level for each of the intensity pixels, selecting a feature detection pixel corresponding to each intensity pixel, developing a normalized power spectrum for each feature detection pixel, determining a feature gain factor for each feature detection pixel from the normalized power spectrum thereof, and calculating a corrected intensity level for each of the plurality of intensity pixels by multiplying the raw intensity level for each intensity pixel by the feature gain factor for the corresponding intensity pixel. The apparatus also includes a display operatively connected to the control and processing unit for displaying the corrected intensity level of each intensity pixel.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
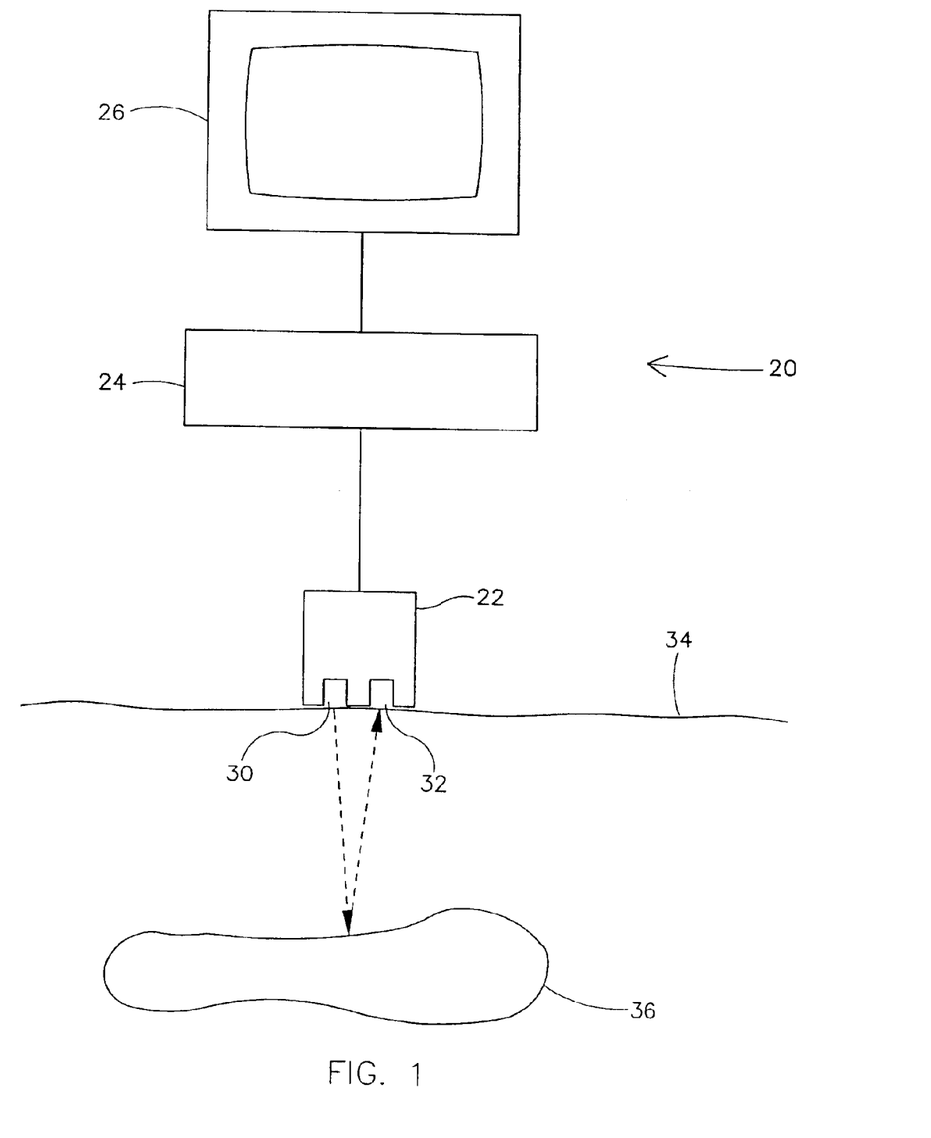
FIG. 1 is a schematic of apparatus of the present invention for ultrasonic imaging.

Referring now to the drawings and in particular to FIG. 1, apparatus of the present invention for ultrasonic imaging is designated in its entirety by the reference numeral 20. The apparatus 20 generally comprises a transducer 22 operatively connected to a control and processor unit 24 connected to a display 26. The transducer 22 includes elements 30, 32 arranged in an array that emit and receive ultrasonic energy, respectively, under the control of the control and processor unit 24. As will be appreciated by those skilled in the art, in most implementations of the present invention each element 30, 32 of the transducer 22 both emits and receives energy. The elements are numbered 30 and 32 for convenience in describing the path of energy to and from the transducer 22. Although the transducer 22 may include fewer or more transmitting and receiving elements 30, 32 without departing from the scope of the present invention, in one embodiment the transducer includes between about 20 and about 128 elements 30, 32 arranged in a line that both transmit and receive ultrasonic energy.

The transducer 22 is placed on or inside the body 34 of a patient. Element 30 emits ultrasonic energy into the body 34 of the patient. The energy is reflected by tissue 36 in the body 34 of the patient. Some of the reflected energy returns to the transducer 22 where element 32 converts the ultrasonic energy into an electrical signal that is sent to the control and processor unit 24. The electrical signal is processed by the control and processor unit 24 and an image corresponding to features detected by the apparatus 20 is displayed on the display 26. With the exception of the hardware and software in the control and processor unit 24 that performs the method of the present invention, the previously described apparatus is conventional and will not be described in further detail.

Figure 2:
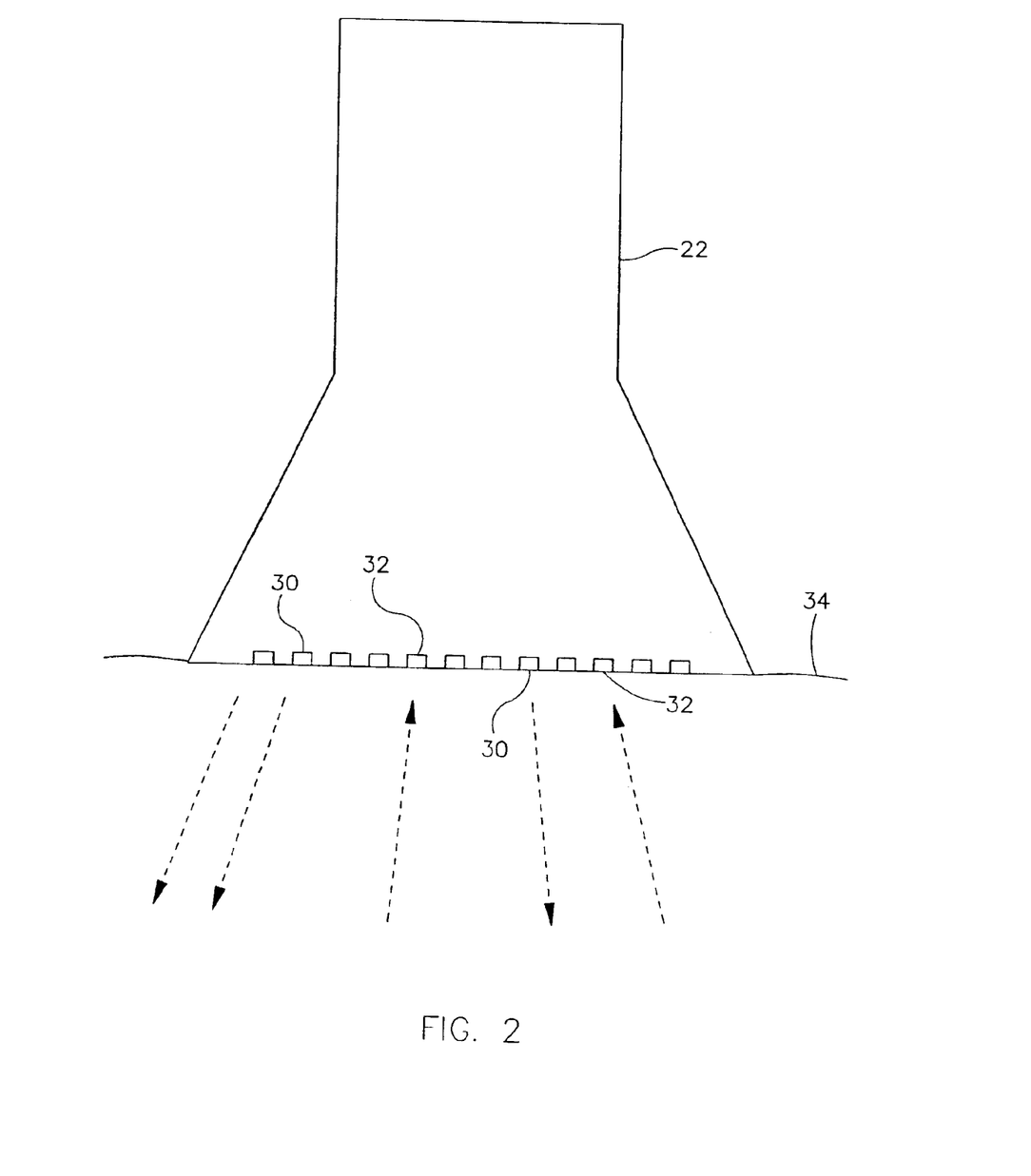
FIG. 2 is a fragmentary schematic of a transducer of the apparatus.

Although only two elements 30, 32 are illustrated in FIG. 1, those of ordinary skill the art will appreciate that the transducer 22 includes an array of elements as shown in FIG. 2 for emitting and receiving ultrasonic energy. There are a variety of conventional means to focus the emitted energy in a given direction, referred to as an image scan line and to receive energy from that image scan line, while largely ignoring energy coming from other image scan lines. One such means, the phased array transducer, will be described below. A conventional planar ultrasound image is formed from a plurality of image scan lines (usually about 40 to about 120 image scan lines) arranged in a sector, usually occupying an angle from about 45 to about 90 degrees. In this case, ultrasound energy is largely confined to a plane by the design of the transducer elements, and further focusing and detection described below take place largely within this plane.

A phased array transducer ignores energy coming from other image scan lines by suitably timing ultrasound pulses emitted by each of the plurality of transmitting elements 30, under the control of control and processing unit 24, so that spherical waves generated by each of the ultrasound pulses constructively interfere (i.e., add up) in the direction of the image scan line, and destructively interfere (i.e., substantially cancel out) in other directions. Ultrasound energy is thus effectively emitted along a given image scan line and reflected by scatterers located along this image scan line. The receiving process uses a similar timing process, under the control of control and processing unit 24, to combine ultrasound signals received by receiving elements 32, so as respond preferentially to ultrasound energy reflected by scatterers along the given image scan line (so the signals received by the respective elements add to one another or constructively interfere), and to largely reject ultrasound energy reflected by scatterers along other image scan lines (so the signals received by the respective elements largely cancel each other or destructively interfere).

Figure 3:
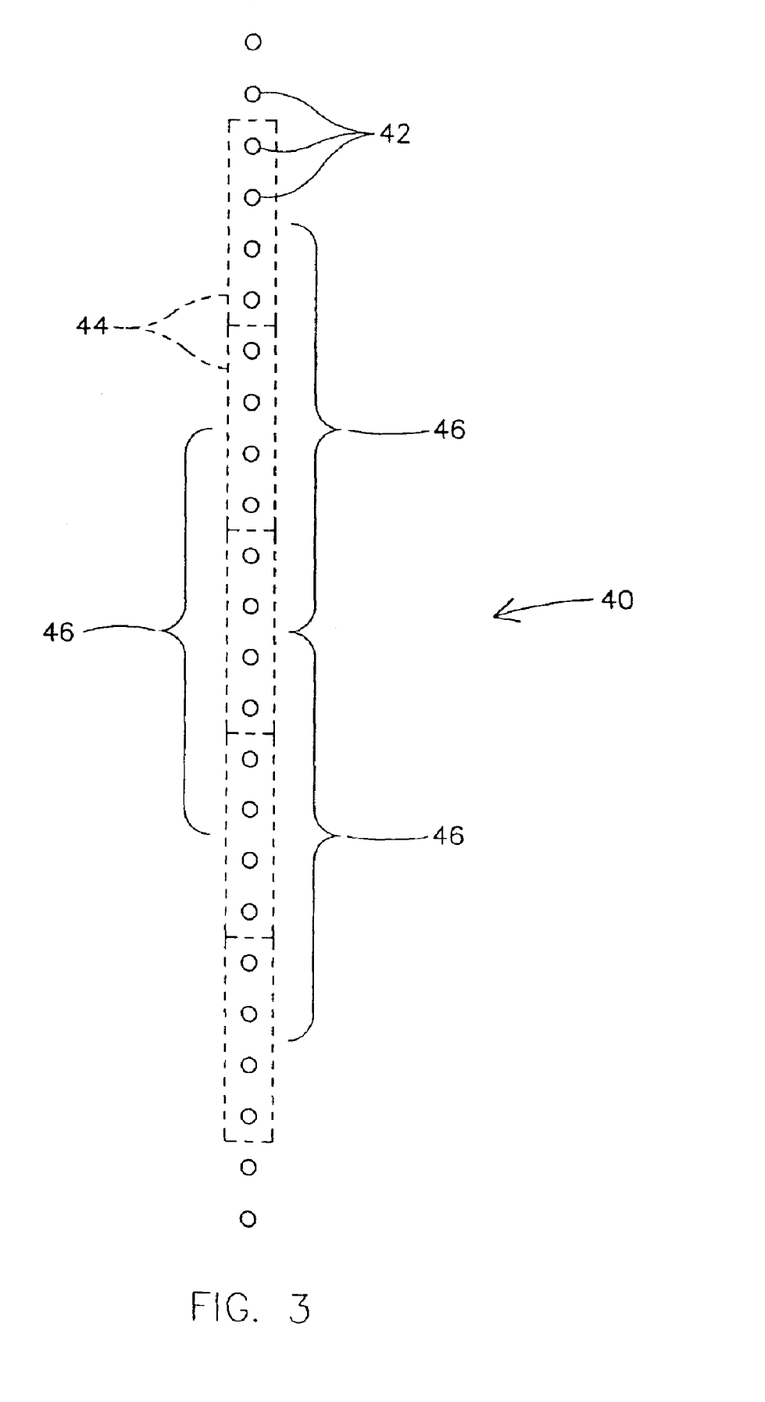
FIG. 3 is a schematic of a digitized scan line and corresponding intensity pixels and feature detection pixels.

As will be appreciated by those skilled in the art, the received ultrasonic energy varies in intensity according to the characteristics of the tissue from which the energy is reflected. The data received from each image scan line is arranged in a digitized scan line, generally designated by 40, as illustrated in FIG. 3. The scan line 40 comprises a plurality of linearly arranged signal intensity data points 42. In one preferred embodiment, conventional time gain compensation is applied to adjust each of the signal intensity data points for depth-related attenuation.

The control and processor unit 24 includes hardware and/or software that processes the data collected by each receiving element 32 to reduce speckle in the ultrasonic image sent to the display 26. The method comprises dividing the scan line 40 into a plurality of intensity pixels 44. Each of the intensity pixels 44 includes at least one data point 42. Although each intensity pixel 44 may include fewer or more data points 42 without departing from the scope of the present invention, in one embodiment each intensity pixel includes thirty-two (32) contiguous data points 42. A raw intensity level and a feature gain factor are determined for each of the intensity pixels 44. These values are multiplied to calculate a corrected intensity level for each intensity pixel 44. The corrected intensity level of each of the intensity pixels 44 is selectively displayed on the display 26.

The step of determining the raw intensity level for each of the intensity pixels 44 comprises rectifying a signal intensity obtained for each data point 42 within the respective intensity pixel and calculating an average of the rectified signal intensities of the data points within the intensity pixel. Optionally, the calculated average of the rectified signal intensities for the intensity pixel may be compressing using conventional procedures such as logarithmic compression. The raw intensity level for each of the intensity pixels 44 is calculated over time to provide a digitized intensity level waveform for each of the intensity pixels.

The step of determining the feature gain factor for each intensity pixel 44 comprises selecting a feature detection pixel 46 corresponding to each intensity pixel. Each of the feature detection pixel 44 includes at least one data point 42. Preferably, at least one of the data points included in the feature detection pixel 44 is also included in the intensity pixel 42 to which the feature detection pixel corresponds. Although each feature detection pixel 46 may include fewer or more data points 42 without departing from the scope of the present invention, in one embodiment each feature detection pixel includes sixty-four (64) contiguous data points 42. Further, in the one embodiment the data points 42 included in the intensity pixel 44 are centrally located in the feature detection pixel 46, and each intensity pixel and the corresponding feature detection pixel share a central signal intensity data point or a central pair of signal intensity data points. The intensity level waveform for each of the feature detection pixels is rectified and a Fourier analysis is performed on the rectified intensity level waveform to obtain Fourier coefficient amplitudes for each of the feature detection pixels. A power spectrum is computed from the Fourier coefficient amplitudes for each of the feature detection pixels.

Once the power spectrum is computed for each feature detection pixel, the values are scanned to determine a value of a peak power spectrum for the pixels. The power spectrum for each feature detection pixel is divided by the value of the peak power spectrum to calculate a cluster index for the feature detection pixel. A feature gain factor is selected for each intensity pixel based at least in part upon the cluster index calculated for the feature detection pixel corresponding to the respective intensity pixel. Various methods (e.g., fuzzy logic or neural networks) may be used to select the feature gain factor for each intensity pixel.

Figure 4:
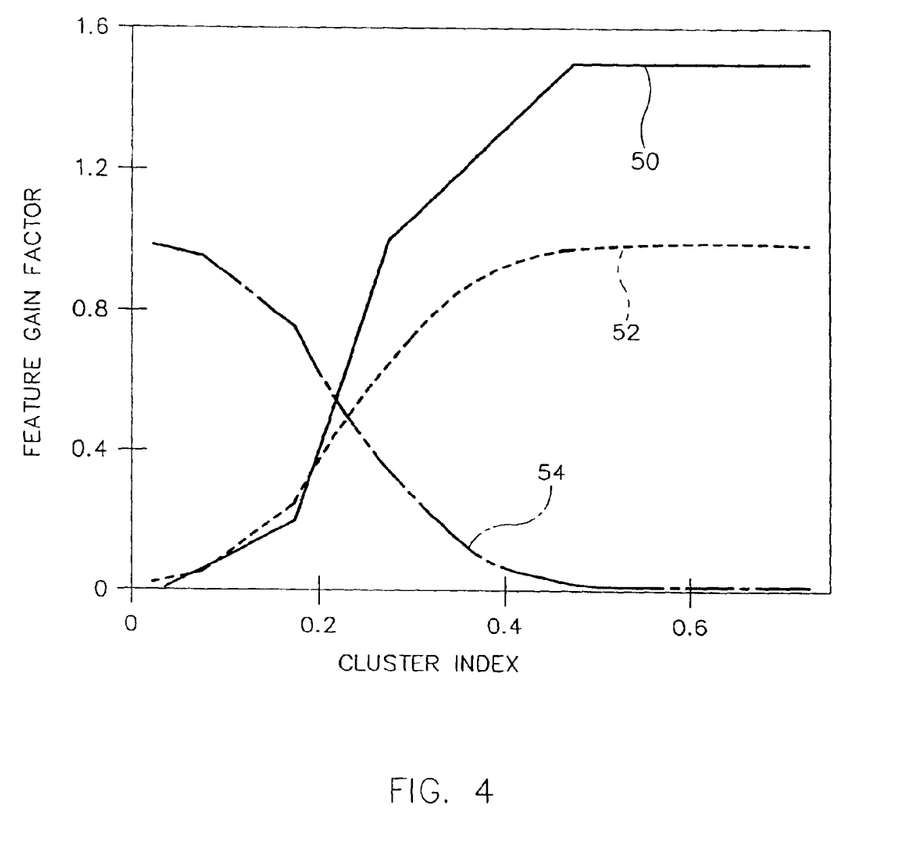
FIG. 4 is a graph showing an example of feature gain control as a function of cluster index.

FIG. 4 is a graph showing one example of a correlation used to select a feature gain factor for a given cluster index. Line 50 is used to select the feature gain factor. Line 50 may be developed by assessing the likelihood that a signal received for a intensity pixel 44 is a result of energy reflected by a structure (e.g., tissue 36) within the body 34 of the patient or adversely affected by phenomena such as speckle. Studies have shown that the probability a signal is caused by a structure within the body increases as the cluster index increases. Line 52 illustrates how the probability that a signal is a result of energy reflected by a structure (e.g., tissue 36) within the body 34 of the patient varies with cluster index. In contrast, the probability a signal is caused by speckle decreases as the cluster index increases. Line 54 illustrates how the probability that a signal is a result of speckle varies with cluster index.

If desired, the corrected intensity level of each of the intensity pixels having a feature gain factor below a predetermined level may be smoothed to further reduce speckle. Although other levels may be used without departing from the scope of the present invention, in one embodiment the predetermined level below which the corrected intensity level is smoothed is about ten percent of a peak compressed intensity level. The corrected intensity level may be smoothed using conventional techniques such as averaging the corrected intensity level with corrected intensity levels of at least one adjacent intensity pixel. In one embodiment, the corrected intensity level is smoothed by averaging the corrected intensity level with corrected intensity levels of each of the immediately adjacent intensity pixels.

Further, if desired the corrected intensity level of each intensity pixel having a feature gain factor above a predetermined level may be displayed in a contrasting color. The predetermined level may be selected to display structures (e.g., organs within a body of a patient) in a contrasting color. Although other levels may be used without departing from the scope of the present invention, in one embodiment the predetermined level above which the corrected intensity level is displayed in a contrasting color is about fifty percent of a peak corrected intensity level of the intensity pixels.

In addition to reducing speckle, those skilled in the art will appreciate that the methods described herein may be used to enhance imaging of features such as perfusion. In one embodiment believed to be particularly suited for enhancing imaging of features such as local characteristics (e.g., perfusion), the cluster index is not smoothed prior to selecting a feature gain factor based on the cluster index. However, in another embodiment believed to particularly suited for speckle reduction, the cluster index is smoothed such as by averaging with cluster indices for adjacent pixels prior to selecting a feature gain factor based on the cluster index.

Although the scan line may be digitized at other rates without departing from the scope of the present invention, in one embodiment the scan line is digitized at a rate equal to about four times a center frequency of the ultrasonic energy reflected by structures within the body. In one embodiment this rate equals about thirty megahertz and each of the signal intensity data points has a length equal to about 25.7 micrometers.

In contrast conventional methods, the most preferred embodiment of the method described above does not include averaging. Thus, the method of the present invention preserves small-scale relative intensity variations due to, for example, boundaries, while altering the display characteristics (e.g., intensity or color) according to the source of the variability (e.g., tissue boundary versus speckle). By not using averaging, the method of the present invention uses all spatial frequencies in the transform domain and preserves all of the collected data. In one embodiment, a brightness of the displayed image is reduced in regions with high speckle content but smaller scale variations in brightness within those regions are preserved. Thus, the method may be used to remove the harmful effects of speckle in degrading the image, while accentuating boundaries.

As will be further appreciated by those skilled in the art, in the described embodiment the software and/or hardware of the control and processor unit 24 performs the steps of the method described above and therefore embodies means for dividing the scan line into a plurality of intensity pixels, means for determining a raw intensity level for each of the intensity pixels, means for determining a feature gain factor for each pixel of the intensity pixels, and means for calculating a corrected intensity level for each of the intensity pixels.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method for reducing speckle in an ultrasonic image formed from a digitized scan line including a plurality of linearly arranged signal intensity data points obtained from ultrasonic energy reflected by structures within a body, said method comprising the steps of:

dividing the scan line into a plurality of intensity pixels, each of said intensity pixels including at least one data point of said plurality of signal intensity data points;

determining a raw intensity level for each of said plurality of intensity pixels;

determining a feature gain factor for each pixel of said plurality of intensity pixels;

calculating a corrected intensity level for each of said plurality of intensity pixels by multiplying the raw intensity level for each intensity pixel by the feature gain factor for the corresponding intensity pixel; and displaying the corrected intensity level of each of said plurality of intensity pixels.

2. A method as set forth in claim 1 wherein the step of determining the raw intensity level for each of said plurality of intensity pixels comprises:

rectifying a signal intensity obtained for each data point within the respective intensity pixel; and calculating an average of the rectified signal intensities of the data points within the intensity pixel.

3. A method as set forth in claim 2 wherein the step of determining the raw intensity level for each of said plurality of intensity pixels further comprises compressing the calculated average of the rectified signal intensities for the intensity pixel.

4. A method as set forth in claim 3 wherein the step of determining the raw intensity level for each of said plurality of intensity pixels comprises logarithmically compressing the calculated average of the rectified signal intensities for the intensity pixel.

5. A method as set forth in claim 1 wherein the step of determining the raw intensity level for each of said plurality of intensity pixels is repeated over time to provide a digitized intensity level waveform for each of said intensity pixels, and the step of determining the feature gain factor for each pixel of said plurality of intensity pixels comprises:

selecting a feature detection pixel corresponding to each intensity pixel of said plurality of intensity pixels;

rectifying the intensity level waveform for each of said feature detection pixels;

performing a Fourier analysis on the rectified intensity level waveform to obtain Fourier coefficient amplitudes for each of the feature detection pixels; and computing a power spectrum from the Fourier coefficient amplitudes for each of the feature detection pixels.

6. A method as set forth in claim 5 wherein the step of determining the feature gain factor for each pixel of said plurality of intensity pixels comprises:

calculating a cluster index for the feature detection pixel corresponding to the intensity pixel; and selecting a feature gain factor for each intensity pixel based at least in part upon the cluster index calculated for the feature detection pixel corresponding to the respective intensity pixel.

7. A method as set forth in claim 6 wherein the step of calculating the cluster index for each feature detection pixel comprises:

determining a value of a peak power spectrum for the plurality of feature detection pixels; and dividing the power spectrum computed for each feature detection pixel by the value of the peak power spectrum for the plurality of feature detection pixels.

8. A method as forth in claim 5 wherein the digitized scan line is a first scan line of a plurality of digitized scan lines, and the step of determining the raw intensity level for each of said plurality of intensity pixels comprises:

calculating an initial intensity level for each of said plurality of intensity pixels; and averaging the initial intensity level of each intensity pixel and the initial intensity level of an adjacent intensity pixel.

9. A method as set forth in claim 1 wherein each intensity pixel includes about 32 adjacent signal intensity data points.

10. A method as set forth in claim 9 wherein each of feature detection pixel includes about 64 adjacent signal intensity data points.

11. A method as set forth in claim 10 wherein each intensity pixel and the corresponding feature detection pixel share a central pair of signal intensity data points.

12. A method as set forth in claim 1 further comprising the step of applying a time gain compensation to adjust each of the signal intensity data points for depth-related attenuation.

13. A method as set forth in claim 1 further comprising the step of smoothing the corrected intensity level of each of said plurality of intensity pixels having a feature gain factor below a predetermined level.

14. A method as set forth in claim 13 wherein the predetermined level below which the corrected intensity level is smoothed is about ten percent of a peak compressed intensity level.

15. A method as set forth in claim 13 wherein the corrected intensity level is smoothed by averaging the corrected intensity level with corrected intensity levels of at least one adjacent intensity pixel.

16. A method as set forth in claim 1 further comprising the step of displaying in a contrasting color the corrected intensity level of each of said plurality of intensity pixels having a feature gain factor above a predetermined level.

17. A method as set forth in claim 16 wherein the predetermined level above which the corrected intensity level is displayed in a contrasting color is about fifty percent of a peak corrected intensity level of said plurality of intensity pixels.

18. A method as set forth in claim 1 wherein said digitized scan line is a first scan line of a plurality of digitized scan lines.

19. A method as set forth in claim 18 wherein said plurality of digitized scan lines consisted of between about 60 scan lines and about 120 scan lines.

20. A method as set forth in claim 18 wherein said plurality of digitized scan lines are arranged in an arc.

21. A method as set forth in claim 20 wherein said arc spans an angle between about 45 degrees and about 90 degrees.

22. A method as set forth in claim 1 wherein said scan line is digitized at a rate equal to about 4 times a center frequency of the ultrasonic energy reflected by structures within the body.

23. A method as set forth in claim 1 wherein the rate at which said scan line is digitized is about thirty megahertz.

24. A method as set forth in claim 1 wherein each of said plurality of linearly arranged signal intensity data points has a length equal to about 25.7 micrometers.

25. A method as set forth in claim 1 wherein each of said plurality of intensity pixels includes about 32 adjacent signal intensity data points.

26. A method for reducing speckle in an ultrasonic image formed from a digitized scan line including a plurality of linearly arranged signal intensity data points obtained from ultrasonic energy reflected by structures within a body, said method comprising the steps of:
   dividing the scan line into a plurality of intensity pixels, each of said intensity pixels including at least one data point of said plurality of signal intensity data points;
   determining a raw intensity level for each of said plurality of intensity pixels;
   selecting a feature detection pixel corresponding to each intensity pixel of said plurality of intensity pixels, each of said feature detection pixels including at least one data point of said plurality of signal intensity data points;
   developing a normalized power spectrum for each feature detection pixel;
   determining a feature gain factor for each feature detection pixel from the normalized power spectrum thereof;
   calculating a corrected intensity level for each of said plurality of intensity pixels by multiplying the raw intensity level for each intensity pixel by the feature gain factor for the corresponding intensity pixel; and
   displaying the corrected intensity level of each of said plurality of intensity pixels.

27. A method as set forth in claim 26 wherein the step of determining the raw intensity level for each of said plurality of intensity pixels comprises:
   rectifying a signal intensity obtained for each data point within the respective intensity pixel; and
   calculating an average of the rectified signal intensities of the data points within the intensity pixel.

28. A method as set forth in claim 27 wherein the step of determining the raw intensity level for each of said plurality of intensity pixels further comprises compressing the calculated average of the rectified signal intensities for the intensity pixel.

29. A method as set forth in claim 28 wherein the step of determining the raw intensity level for each of said plurality of intensity pixels comprises logarithmically compressing the calculated average of the rectified signal intensities for the intensity pixel.

30. A method as set forth in claim 26 wherein the step of determining the raw intensity level for each of said plurality of intensity pixels is repeated over time to provide a digitized intensity level waveform for each of said intensity pixels, and the step of determining the feature gain factor for each pixel of said plurality of intensity pixels comprises:
   rectifying the intensity level waveform for each of said feature detection pixels;
   performing a Fourier analysis on the rectified intensity level waveform to obtain Fourier coefficient amplitudes for each of the feature detection pixels; and
   computing a power spectrum from the Fourier coefficient amplitudes for each of the feature detection pixels.

31. A method as set forth in claim 30 wherein the step of determining the feature gain factor for each pixel of said plurality of intensity pixels comprises:
   determining a value of a peak power spectrum for the plurality of feature detection pixels; and
   dividing the power spectrum computed for each feature detection pixel by the value of the peak power spectrum for the plurality of feature detection pixels.

32. A method as forth in claim 30 wherein the digitized scan line is a first scan line of a plurality of digitized scan lines, and the step of determining the raw intensity level for each of said plurality of intensity pixels comprises:
   calculating an initial intensity level for each of said plurality of intensity pixels; and
   averaging the initial intensity level of each intensity pixel and the initial intensity level of an adjacent intensity pixel.

33. A method as set forth in claim 26 wherein each intensity pixel includes about 32 adjacent signal intensity data points.

34. A method as set forth in claim 33 wherein each of feature detection pixel includes about 64 adjacent signal intensity data points.

35. A method as set forth in claim 34 wherein each intensity pixel and the corresponding feature detection pixel share a central pair of signal intensity data points.

36. A method as set forth in claim 35 wherein the predetermined level below which the corrected intensity level is smoothed is about ten percent of a peak compressed intensity level.

37. A method as set forth in claim 26 further comprising the step of applying a time gain compensation to adjust each of the signal intensity data points for depth-related attenuation.

38. A method as set forth in claim 26 further comprising the step of smoothing the corrected intensity level of each of said plurality of intensity pixels having a feature gain factor below a predetermined level.

39. A method as set forth in claim 38 wherein the corrected intensity level is smoothed by averaging the corrected intensity level with corrected intensity levels of at least one adjacent intensity pixel.

40. A method as set forth in claim 26 further comprising the step of displaying in a contrasting color the corrected intensity level of each of said plurality of intensity pixels having a feature gain factor above a predetermined level.

41. A method as set forth in claim 40 wherein the predetermined level above which the corrected intensity level is displayed in a contrasting color is about fifty percent of a peak corrected intensity level of said plurality of intensity pixels.

42. A method as set forth in claim 26 wherein said digitized scan line is a first scan line of a plurality of digitized scan lines.

43. A method as set forth in claim 42 wherein said plurality of digitized scan lines consisted of between about 60 scan lines and about 120 scan lines.

44. A method as set forth in claim 42 wherein said plurality of digitized scan lines are arranged in an arc.

45. A method as set forth in claim 44 wherein said arc spans an angle between about 45 degrees and about 90 degrees.

46. A method as set forth in claim 26 wherein said scan line is digitized at a rate equal to about 4 times a center frequency of the ultrasonic energy reflected by structures within the body.

47. A method as set forth in claim 26 wherein the rate at which said scan line is digitized is about thirty megahertz.

48. A method as set forth in claim 26 wherein each of said plurality of linearly arranged signal intensity data points has a length equal to about 25.7 micrometers.

49. A method as set forth in claim 26 wherein each of said plurality of intensity pixels includes about 32 adjacent signal intensity data points.

50. Apparatus for reducing speckle in an ultrasonic image formed from a digitized scan line including a plurality of linearly arranged signal intensity data points obtained from ultrasonic energy reflected by structures within a body, said apparatus comprising:

a control and processor unit having:
(a) means for dividing the scan line into a plurality of intensity pixels, each of said intensity pixels including at least one data point of said plurality of signal intensity data points;
(b) means for determining a raw intensity level for each of said plurality of intensity pixels;
(c) means for determining a feature gain factor for each pixel of said plurality of intensity pixels;
(d) means for calculating a corrected intensity level for each of said plurality of intensity pixels by multiplying the raw intensity level for each intensity pixel by the feature gain factor for the corresponding intensity pixel; and
a display for displaying the corrected intensity level of each of said plurality of intensity pixels.

51. Apparatus for producing an ultrasonic image comprising:

a transducer for emitting ultrasonic energy into a body and receiving ultrasonic energy reflected by structures in the body as digitized scan lines, each of said lines including a plurality of linearly arranged signal intensity data points;
a control and processing unit operatively connected to the transducer for controlling the transducer and for processing said digitized scan lines by dividing the scan line into a plurality of intensity pixels, each of said intensity pixels including at least one data point of said plurality of signal intensity data points, determining a raw intensity level for each of said plurality of intensity pixels, determining a feature gain factor for each pixel of said plurality of intensity pixels, and calculating a corrected intensity level for each of said plurality of intensity pixels by multiplying the raw intensity level for each intensity pixel by the feature gain factor for the corresponding intensity pixel; and
a display operatively connected to the control and processing unit for displaying the corrected intensity level of each of said plurality of intensity pixels.

52. Apparatus for reducing speckle in an ultrasonic image formed from a digitized scan line including a plurality of linearly arranged signal intensity data points obtained from ultrasonic energy reflected by structures within a body, said apparatus comprising:

a control and processor unit having:
(a) means for dividing the scan line into a plurality of intensity pixels, each of said intensity pixels including at least one data point of said plurality of signal intensity data points;
(b) means for determining a raw intensity level for each of said plurality of intensity pixels;
(c) means for selecting a feature detection pixel corresponding to each intensity pixel of said plurality of intensity pixels, each of said feature detection pixels including at least one data point of said plurality of signal intensity data points;
(d) means for developing a normalized power spectrum for each feature detection pixel;
(e) means for determining a feature gain factor for each feature detection pixel from the normalized power spectrum thereof; and
(f) means for calculating a corrected intensity level for each of said plurality of intensity pixels by multiplying the raw intensity level for each intensity pixel by the feature gain factor for the corresponding intensity pixel; and
a display for displaying the corrected intensity level of each of said plurality of intensity pixels.

53. Apparatus for producing an ultrasonic image comprising:

a transducer for emitting ultrasonic energy into a body and receiving ultrasonic energy reflected by structures in the body as digitized scan lines, each of said lines including a plurality of linearly arranged signal intensity data points;
a control and processing unit operatively connected to the transducer for controlling the transducer and for processing said digitized scan lines by dividing the scan line into a plurality of intensity pixels, each of said intensity pixels including at least one data point of said plurality of signal intensity data points, determining a raw intensity level for each of said plurality of intensity pixels, selecting a feature detection pixel corresponding to each intensity pixel of said plurality of intensity pixels, each of said feature detection pixels including at least one data point of said plurality of signal intensity data points, developing a normalized power spectrum for each feature detection pixel, determining a feature gain factor for each feature detection pixel from the normalized power spectrum thereof, and calculating a corrected intensity level for each of said plurality of intensity pixels by multiplying the raw intensity level for each intensity pixel by the feature gain factor for the corresponding intensity pixel; and a display operatively connected to the control and processing unit for displaying the corrected intensity level of each of said plurality of intensity pixels.

* * * * *

UNITED STATES PATENT AND TRADEMARK OFFICE
Certificate

Patent No. 6,932,770 B2                                                                 Patented: August 23, 2005

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Harold M. Hastings, Garden City, NY (US); and Scott L. Roth, East Hills, NY (US).

Signed and Sealed this Thirtieth Day of September 2008.

BRIAN L. CASLER
*Supervisory Patent Examiner*
Art Unit 3737